(12) United States Patent
Noyes

(10) Patent No.: US 10,956,265 B2
(45) Date of Patent: Mar. 23, 2021

(54) METHOD OF PERFORMING SINGLE EVENT UPSET TESTING

(71) Applicant: Hamilton Sundstrand Corporation, Charlotte, NC (US)

(72) Inventor: Steven Noyes, Chandler, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1358 days.

(21) Appl. No.: 14/612,485

(22) Filed: Feb. 3, 2015

(65) Prior Publication Data
US 2016/0224449 A1 Aug. 4, 2016

(51) Int. Cl.
*G06F 11/00* (2006.01)
*G06F 11/10* (2006.01)

(52) U.S. Cl.
CPC ...... *G06F 11/1076* (2013.01); *G06F 11/1052* (2013.01)

(58) Field of Classification Search
CPC ..... G06F 11/263; G06F 11/1076; G06F 11/26
See application file for complete search history.

(56) References Cited

U.S. PATENT DOCUMENTS

| | | |
|---|---|---|
| 4,786,865 A | 11/1988 | Arimura et al. |
| 5,606,662 A * | 2/1997 | Wisor ................. G06F 11/1052 714/48 |
| 5,903,717 A | 5/1999 | Wardrop |
| 5,929,645 A | 7/1999 | Aton |
| 6,085,350 A | 7/2000 | Emmert et al. |
| 6,326,809 B1 | 12/2001 | Gambles et al. |
| 6,696,873 B2 | 2/2004 | Hazucha et al. |
| 6,963,217 B2 | 11/2005 | Samudrala et al. |
| 7,036,059 B1 | 4/2006 | Carmichael et al. |
| 7,167,404 B2 | 1/2007 | Pathak et al. |
| 7,249,010 B1 | 7/2007 | Sundararajan et al. |
| 7,627,840 B2 | 12/2009 | Kleinosowski et al. |
| 7,673,202 B2 | 3/2010 | Chung |
| 8,189,367 B1 | 5/2012 | Lawson et al. |
| 8,522,074 B2 * | 8/2013 | Markison ............ G06F 11/1076 714/6.24 |
| 2007/0096754 A1 | 5/2007 | Johnson et al. |
| 2008/0046136 A1 * | 2/2008 | Leonard ................. G01C 23/00 701/3 |
| 2010/0163756 A1 | 7/2010 | McPeak |

(Continued)

FOREIGN PATENT DOCUMENTS

CN 100576221 C 12/2009
CN 102096627 A 6/2011
(Continued)

OTHER PUBLICATIONS

CAFC, *Intellectual Ventures v. Capital One*, pp. 1-18 (Year: 2017).*
(Continued)

*Primary Examiner* — Jonathan D Gibson
(74) *Attorney, Agent, or Firm* — Carlson, Gaskey & Olds, P.C.

(57) ABSTRACT

A system for simulating an event includes a memory system, a parity generator/validator, and a fault injector. The fault injector is configured to inject bits at an address in the memory system when the parity generator/validator is in an disabled state. A method of injecting a fault is also disclosed.

14 Claims, 2 Drawing Sheets

(56) References Cited

U.S. PATENT DOCUMENTS

| | | | | |
|---|---|---|---|---|
| 2011/0219208 A1* | 9/2011 | Asaad | ................... | G06F 15/76 |
| | | | | 712/12 |
| 2012/0084628 A1* | 4/2012 | Cox | ................... | G06F 11/167 |
| | | | | 714/763 |
| 2012/0144244 A1* | 6/2012 | Dan | ..................... | G11C 29/10 |
| | | | | 714/39 |
| 2012/0239993 A1 | 9/2012 | Chung | | |

FOREIGN PATENT DOCUMENTS

| | | |
|---|---|---|
| CN | 102169022 A | 8/2011 |
| CN | 102521467 B | 4/2013 |
| CN | 103198868 A | 7/2013 |

OTHER PUBLICATIONS

Dutton, Bradley et al., Embedded Processor Based Fault Injections and SEU Emulation for FPGAs, International Conf. on Embedded Systems and Applications, pp. 183-189, 2009.

Rebaudengo, M. et al., "Accurate Analysis of Single Event Upsets in a Pipelined Microprocessor" Dipartimento di Automatica e Informatica, Torino, Italy, www.cad.polito.it.

Ziade, Haissam et al., "A New Fault Injection Approach to Study the Impact of Bitflips in the Configuration of SRAM-Based FPGAs, " The International Arab Journal of Information Technology, vol. 8, No. 2, pp. 155-162, Apr. 2011.

* cited by examiner

METHOD OF PERFORMING SINGLE EVENT UPSET TESTING

TECHNICAL FIELD

This application relates to a method of testing electronic equipment for single upset event resistance.

BACKGROUND

Single Upset Events (SEUs) are changes of state caused by ions or electro-magnetic radiation striking an electric device, which can cause an error or malfunction in hardware device output and can in turn affect software operation. Airborne and space systems are susceptible to SEUs. SEUs can be mitigated by parity protection or certain Error Correction Code (ECC) on memory.

Predicting the impact of SEUs becomes increasingly important as the complexity of electronics increases, and as they become more compact. One common way to test the impact of SEUs is to expose the electronics to radiation, such as in a particle accelerator.

SUMMARY

A system for simulating an event according to an exemplary embodiment of the present disclosure includes a memory system, a parity generator/validator, and a fault injector. The fault injector is configured to inject bits at an address in the memory system when the parity generator/validator is in an disabled state.

A method of injecting a fault according to an exemplary embodiment of the present disclosure includes determining an address, disabling a parity generator/validator, determining a bit, and writing the bit to the address.

These and other features may be best understood from the following drawings and specification.

DETAILED DESCRIPTION

Figure 1:
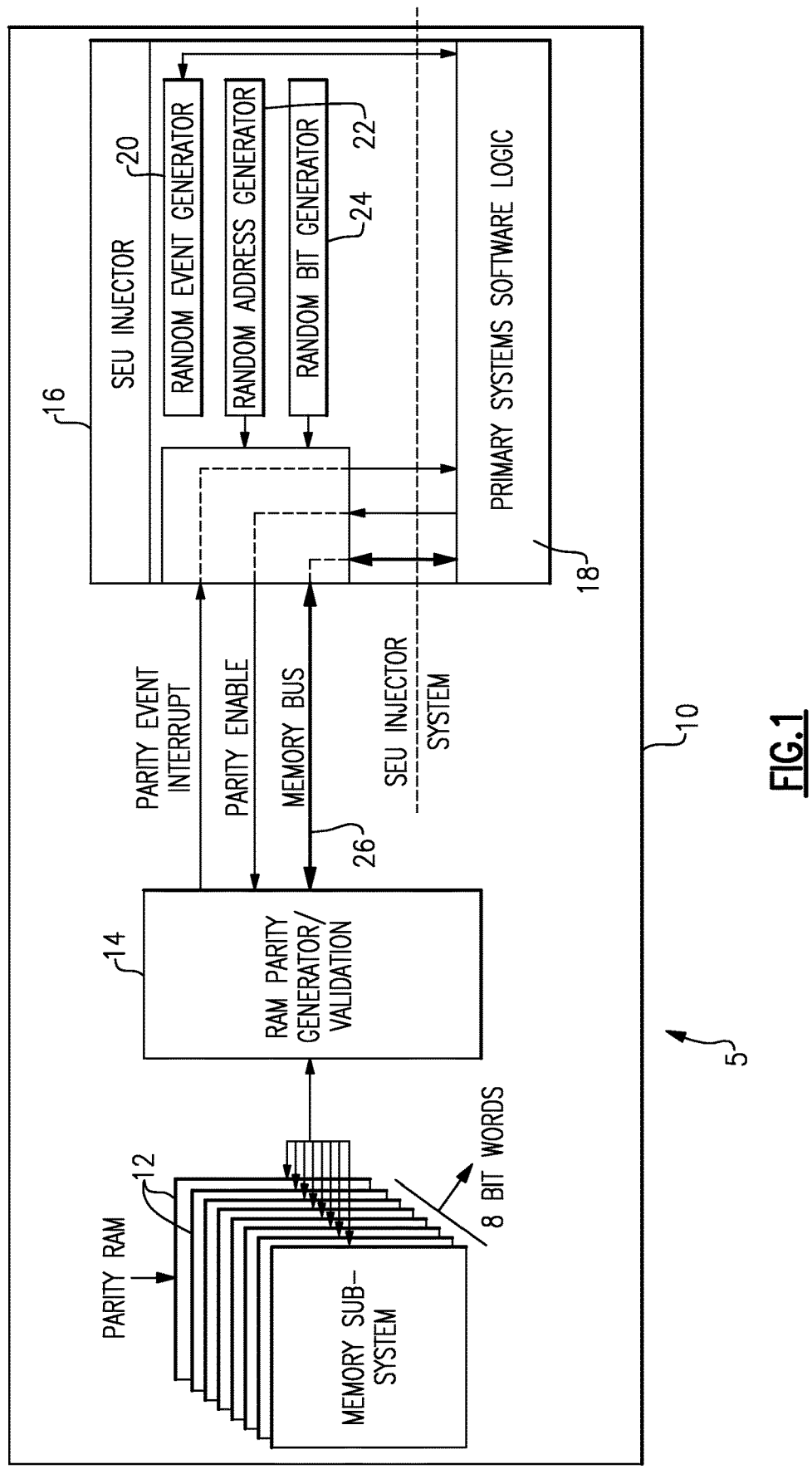
FIG. 1 schematically illustrates a system for testing the effect of Single Upset Events on an electronic device.

FIG. 1 shows a system 5 for testing the effect of Single Upset Events on an electronic device 10. The electronic device 10 includes memory sub-systems 12, a parity generator/validator 14, and a Single Even Upset (SEU) injector 16. In one example, the SEU injector 16 is a separate chip that performs the SEU injecting function described below autonomously. In another example, the SEU injector 16 is a software program on the electronic device 10 that performs the SEU injecting function described below. Each of the memory sub-systems 12 incudes a redundant parity bit stored in Random Access Memory ("parity RAM") which provides a measure of protection against error such as those caused by SEUs. The redundant parity bit represents whether a string of data (a "word") is "odd" or "even." Redundant parity bits allows for the comparison of a stored parity bit with a computed parity bit to determine whether a data error has occurred. That is, parity RAM is compared to parity in computer code of the electronic device 10. If the parity RAM is different from that stored in the electronic device, an error may have occurred.

The memory sub-systems 12 can be external or internal memory on any subcomponent of an electronic device 10. Thus a specific subcomponent of an electronic device can be targeted for SEU injection by the SEU injector 16 by selecting which of the memory sub-systems 12 to target.

The parity generator/validator 14 provides the parity bit to the memory subsystems 12 by generating parity bits during memory writing operations or reading parity bits during memory reading operations. The generator/validator 14 can detect discrepancies in parity caused by an error such as an SEU. The SEU injector 16 includes a primary system 18 which provides the software/logic for a random event generator 20, which performs a timekeeper function to determine when faults should be injected, or added to the memory sub-systems 12 of the electronic device 10 by adding, deleting, or changing bits. The injector 16 also includes a random address generator 22 and a random bit generator 24. The random address generator 22 generates a random address in the memory sub-systems 12 into which to inject a random bit generated by the random bit generator 24. The random bit is injected into the memory subs-systems 12 of the electronic device 10 via a memory bus 26.

Figure 2:
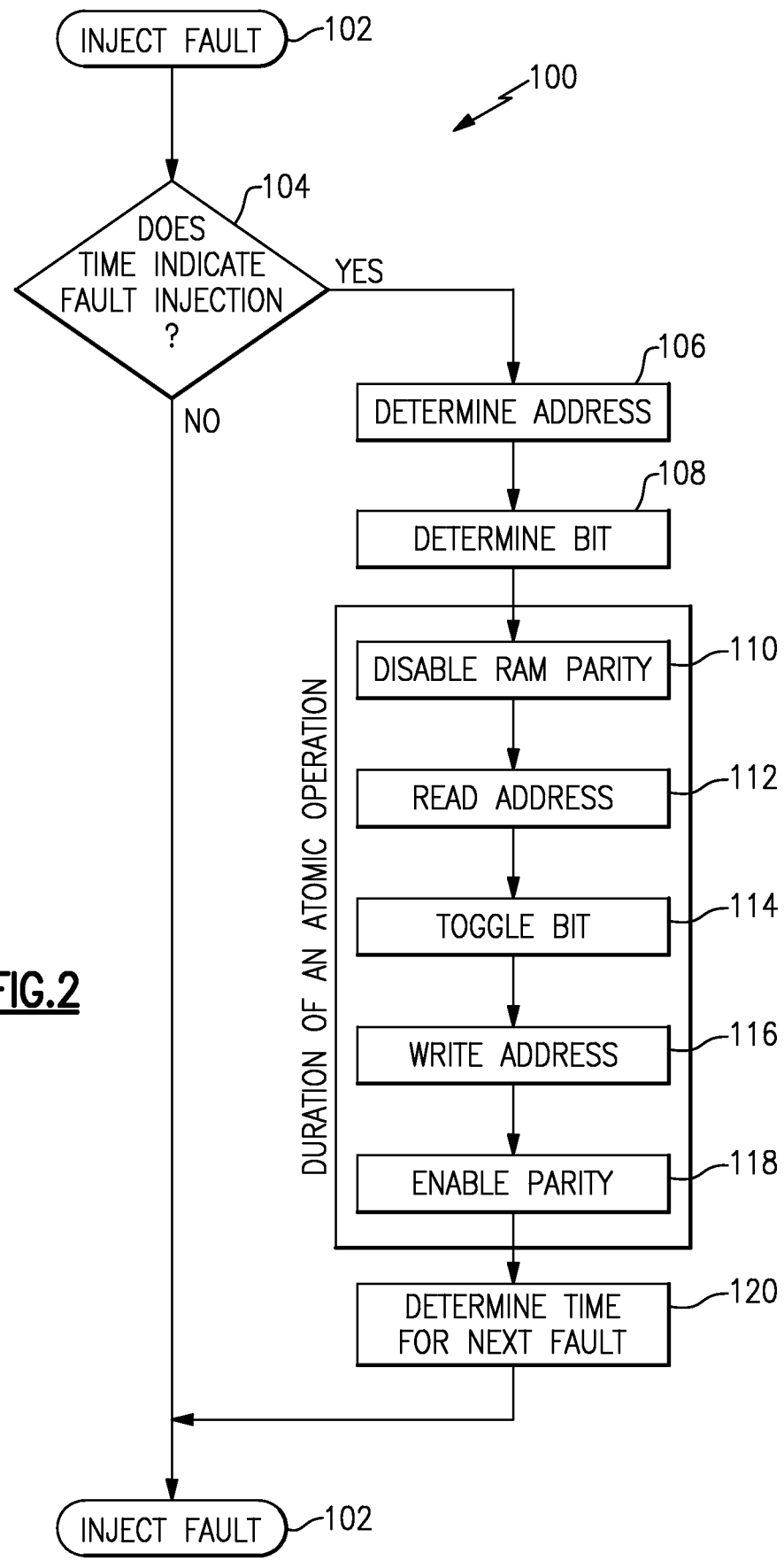
FIG. 2 illustrates a method of injecting a fault into an electronic device.

The SEU injector 16 is employed by the method 100 of FIG. 2. In step 102, a fault (random bit generated by the random bit generator 24) is injected into the electronic device 10.

In step 104, the method 100 determines whether time indicates fault injection. Said another way, the method 100 determines how often faults should be injected. How often faults are injected simulates different real-world conditions in which SEUs can affect the electronic device 10. For example, higher-frequency fault injection may simulate high-altitude aircraft flight conditions, whereas lower-frequency fault injection may simulate lower-altitude flight conditions.

If in step 104 the time indicates fault injection, in step 106 an address for fault injection is determined by the random address generator 22. The address can by within a bounded range of addresses in the memory sub-systems 12.

In step 108, a bit is determined by the random bit generator 24. The bit can be any kind of bit, including a parity bit, a redundant protection bit, etc.

In step 110, the parity generator/validator 14 is disabled. This allows the fault to be injected into the electronic device 10. In step 112, the address from step 108 is read. In step 114, the bit at the address it toggled. That is, the bit is changed from a "one" to a "zero" or vice versa. In step 116, the bit determined in step 108 is written to the address determined in step 106. In step 118, the parity generator/validator 14 is re-enabled. In one example, steps 110 through 118 comprise an atomic operation. That is, steps 110 through 118 are effectively performed as a single step that does not allow other processes to read or write to the memory sub-systems 12 during its duration.

In step 120, the method 100 determines a time for the next fault to be injected. The method then repeats by performing step 102, fault injection, again. Likewise, if in step 102 the time does not indicate fault injection, the method repeats.

The system 5 and method 100 allows simulation of various real-world conditions under which electronic devices may be susceptible to SEUs. As the method 100 is repeated, data about the behavior of the electronic device 10 in response to fault injection can be collected and analyzed to allow for the design of improved electronic devices that can better withstand SEUs. Such data can be collected under various simulated operating conditions depending on the expected application of the electronic device 10.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A system for simulating an event, comprising:
   a memory system;
   a parity generator/validator; and
   a fault injector, the fault injector configured to inject bits at an address in the memory system when the parity generator/validator is in an disabled state.

2. The system of claim 1, wherein the fault injector includes a random bit generator configured to generate the bits.

3. The system of claim 1, wherein the fault injector includes a random address generator configured to generate the address.

4. The system of claim 1, wherein the fault injector includes a random event generator, which is configured to perform as a timekeeper.

5. The system of claim 1, wherein the bits are injected into the memory system via a memory bus.

6. The system of claim 1, wherein the memory system includes a plurality of subsystems, and the bit is injected into one of the plurality of subsystems.

7. The system of claim 1, wherein the memory system is on an electronic device on one of an aircraft and a spacecraft.

8. A method of injecting a fault, comprising:
   determining an address;
   disabling a parity generator/validator;
   determining a bit;
   writing the bit to the address; and
   determining a time for a next fault injection.

9. The method of claim 8, further comprising enabling a parity generator/validator subsequent to the writing step.

10. The method of claim 9, wherein the disabling, writing, and enabling steps comprise an atomic operation.

11. The method of claim 10, wherein the atomic operation further includes toggling a bit at the address.

12. The method of claim 8, further comprising determining whether time indicates a fault injection prior to the determining step.

13. The method of claim 12, wherein the address is determined if time indicates fault injection and is not determined if fault does not indicate fault injection.

14. The method of claim 12, wherein the step of determining whether time indicates a fault injection corresponds to an operation condition of an electronic device.

* * * * *